(12) United States Patent
Chawla et al.

(10) Patent No.: US 8,141,075 B1
(45) Date of Patent: Mar. 20, 2012

(54) RULE ENGINE FOR VIRTUALIZED DESKTOP ALLOCATION SYSTEM

(75) Inventors: Puneet Chawla, Sunnyvale, CA (US); Jennifer-Ann M. Anderson, Palo Alto, CA (US); Gerald C. Chen, Palo Alto, CA (US); Junaid Qurashi, Los Altos, CA (US); Patrick Lin, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1333 days.

(21) Appl. No.: 11/430,683

(22) Filed: May 8, 2006

(51) Int. Cl.
*G06F 9/455* (2006.01)
(52) U.S. Cl. .......................................................... 718/1
(58) Field of Classification Search ........................ 718/1
See application file for complete search history.

(56) References Cited

U.S. PATENT DOCUMENTS

| | | | | |
|---|---|---|---|---|
| 4,965,882 A * | 10/1990 | Barabash et al. | ................ | 706/10 |
| 5,889,953 A * | 3/1999 | Thebaut et al. | ................ | 709/221 |
| 6,073,262 A * | 6/2000 | Larkin et al. | ................... | 714/736 |
| 6,490,574 B1 * | 12/2002 | Bennett et al. | ................... | 706/47 |
| 7,266,822 B1 * | 9/2007 | Boudnik et al. | ............... | 718/100 |
| 7,954,150 B2 * | 5/2011 | Croft et al. | ....................... | 726/21 |
| 2004/0010787 A1 * | 1/2004 | Traut et al. | ......................... | 718/1 |
| 2005/0005174 A1 * | 1/2005 | Connors | ......................... | 713/202 |
| 2005/0060590 A1 * | 3/2005 | Bradley et al. | ................ | 713/320 |
| 2005/0071842 A1 * | 3/2005 | Shastry | .......................... | 718/100 |
| 2005/0108709 A1 * | 5/2005 | Sciandra et al. | ................... | 718/1 |
| 2005/0120160 A1 * | 6/2005 | Plouffe et al. | ...................... | 711/1 |

\* cited by examiner

*Primary Examiner* — Meng An
*Assistant Examiner* — Blake Kumabe

(57) ABSTRACT

A plurality of virtual machines (VMs) is established and maintained by virtualization software on one or more physical servers. Desktop management software operates to provide the VMs to remote users as virtualized desktops. The desktop management software includes a rule engine that can be used to automate the policies of the organization. The rule engine manages the data center by controlling virtual infrastructure operations, such as power-on, power-off, suspension, and migration operations. The rule engine uses an event-condition-action paradigm, wherein an event causes a virtual infrastructure operation, possibly contingent on a condition. The rule engine provides for time-based scheduling of events in addition to system-based operations, which are triggered by events such as user logon and user logoff. The rule engine may also include the ability to automate the process of changing the properties of the virtual machines in a timely fashion.

44 Claims, 8 Drawing Sheets

RULE ENGINE FOR VIRTUALIZED DESKTOP ALLOCATION SYSTEM

BACKGROUND OF THE INVENTION

1. Field of the Invention

This invention relates to virtualized computer systems, and, in particular, to a system and method for using rules to automate the provisioning of remote desktops based on policies on a virtualized computer platform.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. FIG. 1 shows one possible arrangement of a computer system 700 that implements virtualization. A VM 200, which in this system is a "guest," is installed on a "host platform," or simply "host," which will include system hardware 100, that is, a hardware platform, and one or more layers or co-resident components comprising system-level software, such as an operating system (OS) or similar software layer responsible for coordinating and mediating access to hardware resources.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 or similar virtualized mass storage device, and one or more virtual devices 270. Note that a disk—virtual 240 or physical 140—is also a "device," but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-cored" architecture, in which more than one physical CPU is fabricated on a single chip, with its own set of functional units (such as a floating-point unit and an arithmetic/logic unit ALU), and can execute threads independently; multi-cored processors typically share only very limited resources, such as at least some cache. Still another technique that provides for simultaneous execution of multiple threads is referred to as "simultaneous multithreading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1 illustrates multiple virtual processors 210, 211, . . . , 21m (VCPU0, VCPU1, . . . , VCPUm) within the VM 200. Each virtualized processor in a VM may also be multi-cored, or multi-threaded, or both, depending on the virtualization. This invention may be used to advantage regardless of the number of processors the VMs are configured to have.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, regardless of the structure of the particular virtualization software.

By way of illustration and example only, the figures show each VM running on a corresponding virtual machine monitor. The description of use of VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which ho software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS that is used to perform certain input/output (I/O) operations, alongside and sometimes at the request and direction of a virtualization software component such as the VMM 300. The host OS 420, which usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320, often with an associated translation cache 325, may be included to provide execution speed while still preventing the VM from directly executing certain privileged instructions (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted." Compared with a system in which VMMs (or other software components or layers with similar functionality) run directly on the hardware platform (such as shown in FIG. 2), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMsNMMs. The kernel 600 also handles any other applications running on it that can be separately scheduled, as well as any temporary "console" operating system 420 that, in some systems, is included for such operations as boot the system as a whole or enabling certain user interactions with the kernel. The console OS in FIG. 1 may be of the same type as the host OS in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

The invention, or at least certain of the components included in the overall virtualization software to implement the invention, may also be implemented directly in a computer's primary OS. Moreover, certain of the components included in the overall virtualization software to implement the invention might even be implemented wholly or partially in hardware, for example in processor architectures intended to provide hardware support for virtual machines.

Remote Desktop Servers

In early multi-user computer systems, users at "dumb" terminals time-shared the resources of a central system. Although different users could be given different priorities, and an administrator at the central system could control more than the time-sharing users, all users were accessing the same non-customized hardware and software system resources and were presented with substantially the same interface. Moreover, some actions of one user during a session could often affect the sessions of other users.

Much more recently, remote desktop servers have been provided that allow users to access, via a network such as the Internet, a stand-alone computer ("desktop"). From the desktop, the user can run software applications provided by the remote desktop server, or access data provided by the remote desktop server. Remote desktops may be used, for example, by users performing data entry; by employees who wish to use a home computer to access a company's data or software applications, by software developers developing and testing applications on a remote system, or in any other circumstance in which the resources of a remote computer are desired.

Throughout the course of a workday, virtual machines may be powered on, powered off, or allocated varying resources, in accordance with the policies of a company. For example, a company may require that desktops be powered on at 8:00 am, powered off at 6:00 pm; and that a server be powered on at 10:00 pm to run a certain simulation. In order to perform such operations on virtualized desktops, existing systems may require an administrator or other user to input information. Manual input may be cumbersome, particularly for operations that must be performed at odd hours.

In many cases a policy is required to be enforced. For example, a company may require all the desktops to be powered off if no user is active. Manual input may be difficult in such a case because the operation is dependent on real time information, and an administrator may therefore be required to monitor the system at all times. Using a manual system may furthermore render the policies difficult to enforce, such as when a worker is responsible for powering off his or her own desktop at the end of the day.

An alternate method for implementing policies may include hard-coding the policies into the system to ensure that they are enforced. However, the needs of the company may change, and such a solution does not provide for flexibility of the system.

Furthermore, in the event that one server needs to be taken down, there is no support for continuing ongoing sessions on another physical server, or for check-pointing the session to store any changes.

In many cases, the installation, configuration and ongoing operation of remote desktop servers can be quite complex and time consuming, and it can be inefficient in its use of hardware resources and the personnel resources of an IT department. What is needed therefore is an improved method and system for providing remote desktop access.

SUMMARY OF THE INVENTION

The invention generally relates to providing a system that enables users, from remote terminals, to access virtualized desktop computers, in the form of virtual machines, so as to be able to have working sessions that are isolated from the sessions of other users and that can be stored and even migrated to different physical platforms as the need arises, and that, according to certain rules, can even use a virtualized desktop that is at least partially and individually customized. An interface layer, termed a desktop management server, comprises desktop management software with various functions that are described below. The desktop management software includes a connection broker, which allows a remote user to select a type of virtualized desktop and initiate a desktop session, or a connection to the virtualized desktop.

Within the system for providing remote desktops on a virtualized computer platform, a rule engine may be implemented to automate the policies of the organization. The rule engine includes scheduling for managing the data center by controlling, for example, the power-on, power-off, suspension, and migration operations for virtualized desktops. The rule engine may perform such scheduled operations on a time-based schedule, as input, for example, by an administrator, or in response to the expiration of a lease or the expiration of a virtualized desktop's lifetime. The rule engine may also include the ability to automate the process of changing the resources allocated to the virtual machines in a timely fashion. The rule engine further operates on the conditions enforced by the administrator. This provides the flexibility in defining the policies that are executed based on some real time information maintained by the desktop management server.

In one implementation, a method of performing a virtual infrastructure operation on one or more virtual machines includes sensing occurrence of an event and selecting a rule based on the sensed event. The method also includes evaluating a condition based on the rule, and, based on the result of the evaluation, performing a virtual infrastructure operation on one or more virtual machines, the virtual infrastructure operation affecting the properties of one or more virtualized desktops.

DETAILED DESCRIPTION

Figure 1:
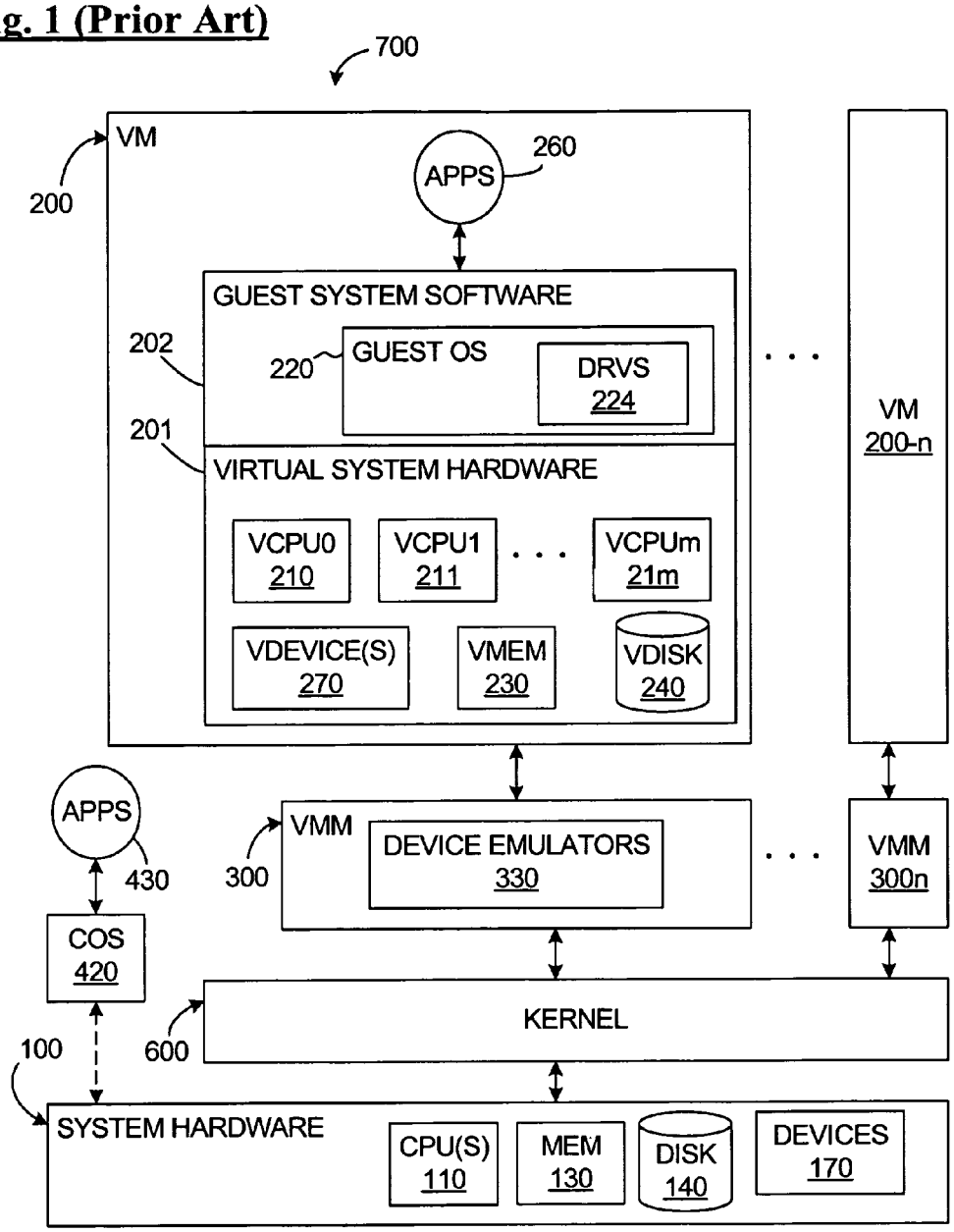
FIG. 1 illustrates the main components of a generalized kernel-based hosted virtual computer system (prior art).
Figure 2:
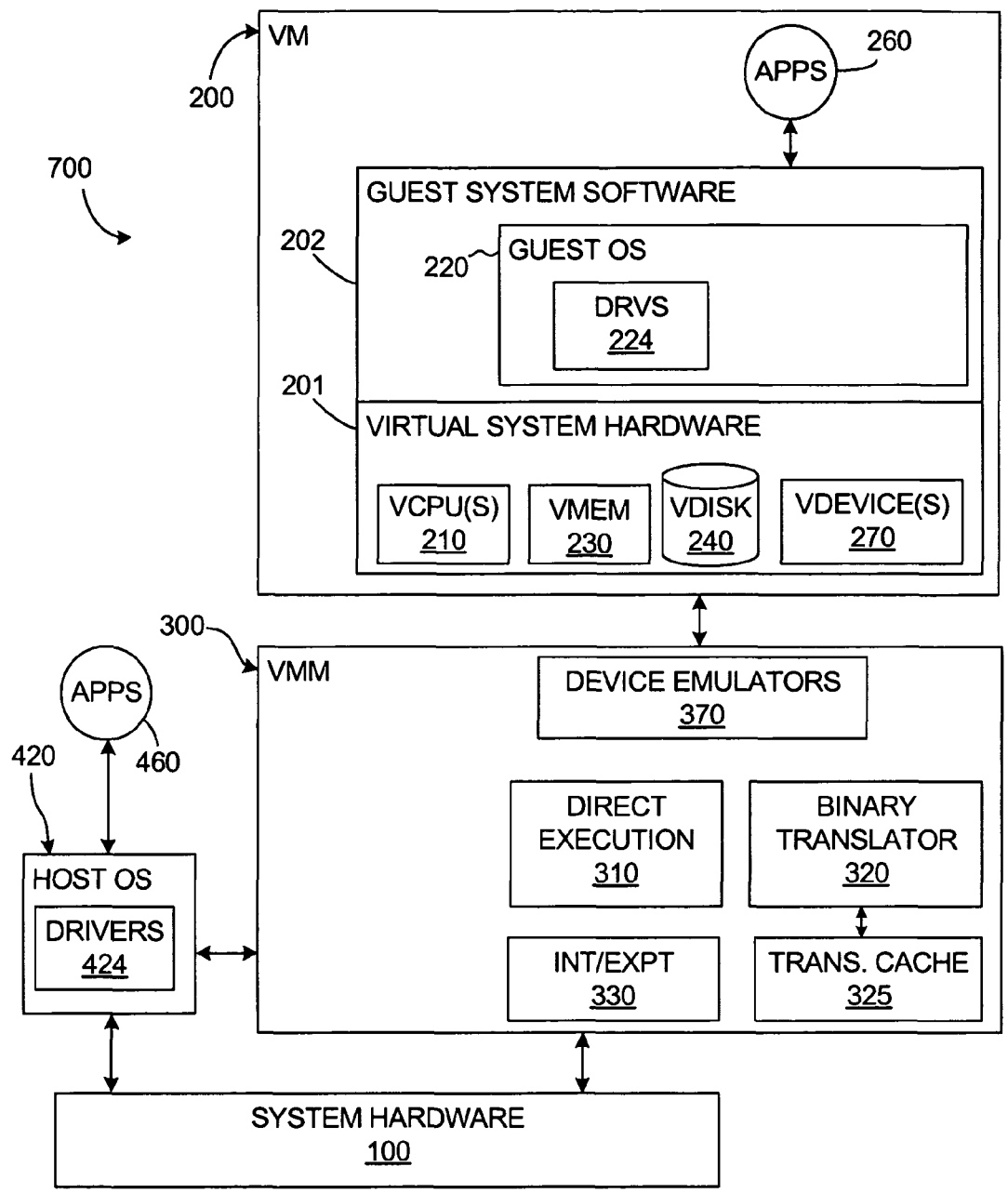
FIG. 2 illustrates the main components of a generalized hosted virtual computer system (prior art).

Embodiments of this invention may be implemented in a wide variety of computers having a wide variety of hardware architectures and configurations, as long as an interface is provided that allows the architecture to be virtualized. Furthermore, embodiments of the invention may be implemented in a wide variety of groups of computers, where all computers in the group may have a common hardware architecture and configuration, or with any combination of computers having a wide variety of different hardware architectures and/or configurations. Thus, for example, the invention may be implemented in a large corporate computer network having many server computers, with each server having the same hardware architecture, such as the x86 architecture, or with the network of computers comprising a variety of servers having some mix of hardware architectures.

The invention may also be used to execute a wide variety of individual software applications or any combination of a wide variety of different software applications. The invention is particularly useful, however, for providing remote desktop sessions to remote users using a virtualized computer platform. A remote desktop session, for example, may comprise a connection to a virtualized desktop that is remote from the user, wherein the user accesses the virtualized desktop via a network. The user may input information to the virtualized desktop, and may receive information from the virtualized desktop, for example, using a graphical user interface (GUI) presented on a terminal local to the user.

One implementation includes a rule engine which can be used to automate the provisioning policies for allocating resources to desktops in a timely fashion or based on some event. At a scheduled time or when a particular event is detected, the rule engine may evaluate one or more conditions in real time, and based on the results of the evaluation, a virtual infrastructure operation may be performed. A virtual infrastructure operation is any operation that affects the properties of one or more VMs, such as operations that allocate resources to VMs, change the state of VMs, change the software running on VMs, change the other properties of VMs, or change the properties of the hosts running the VMs.

Examples of virtual infrastructure operations include: powering on a VM, powering off a VM, suspending a VM, resuming a VM, cold migration of a VM (a migration that is performed while the VM is off-line), hot migration of a VM (a migration that is performed while the VM is on-line), creation of a VM, deletion of a VM, cloning a VM, taking a snapshot of a VM, adding a host to the cluster of physical hosts used for hosting desktops, removing a host from the cluster of physical hosts used for hosting desktops, and the like. Other examples of virtual infrastructure operations include maintaining or updating the VM, maintaining or updating applications loaded in the VM, performing system-wide software updates (such as software patches or updates of virus definitions), or other similar operations. In general, any operation that changes the state of one or more VMs, changes the software loaded in one or more VMs, changes the state of one or more servers hosting VMs, or changes the software loaded in one or more servers hosting VMs, may be considered to change a property of a VM, and may thus be considered a virtual infrastructure operation.

The rule engine may provide for time-based scheduling, wherein virtual infrastructure operations are performed at a scheduled time, as input by an administrator. The rule engine may also provide for event-driven operations, wherein virtual infrastructure operations are performed in response to a particular event in the system. Time based scheduling and event-driven operations scheduling can also be annotated by conditions such that the operations are applied only when a condition is satisfied.

Figure 3A:
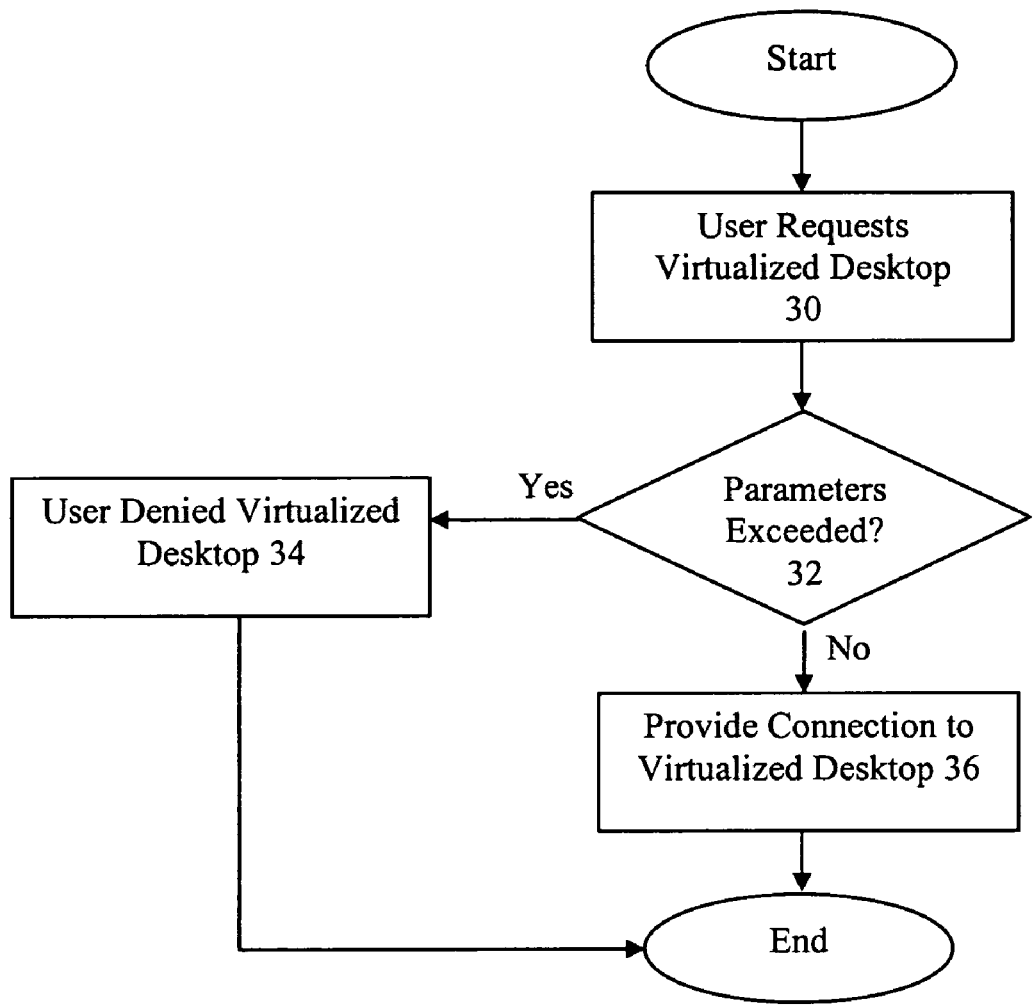
FIG. 3a illustrates a method for providing a connection to a virtualized desktop, in accordance with embodiments of the present invention.

FIG. 3a is a flow chart illustrating a method for providing a user with a virtualized desktop. As shown in FIG. 3a, the method may begin in step 30, wherein a user may request a virtualized desktop. The method may begin in step 32, wherein it may be determined whether providing a connection to the desktop would cause any parameters to be exceeded. If any parameters would be exceeded, the user may be denied the virtualized desktop in step 34. However, if no parameters would be exceeded, the user may be provided with a connection to the virtualized desktop in step 36.

The parameters used in the method of FIG. 3a may include resource pool parameters and Quality of Service (QoS) parameters. Resource pool parameters may be used to guarantee resources for a particular VM or group of VMs in the system. In addition, resource pool parameters may be used to guarantee resources for a particular user. Lower level software provides load balancing capabilities based on the resource pool parameters.

In addition to the resource pool parameters, one or more QoS parameters may be specified. The QoS parameters may describe, for example, the maximum number of VMs that may be allocated to any one user, the maximum number of VMs that may run on each physical machine, and the maximum number of VMs that may be managed by each virtual machine management server. If opening a new desktop session or performing some other action would cause one of the QoS parameters to be exceeded, the action will not be allowed.

If it is determined that providing a connection to a virtualized desktop would cause the resource pool parameters and/or the QoS parameters to be exceeded in step 32, the connection will be denied in step 34. Because the resource pool parameters and QoS parameters cannot be exceeded, the resources and QoS specified by the parameters can be guaranteed.

Figure 3B:
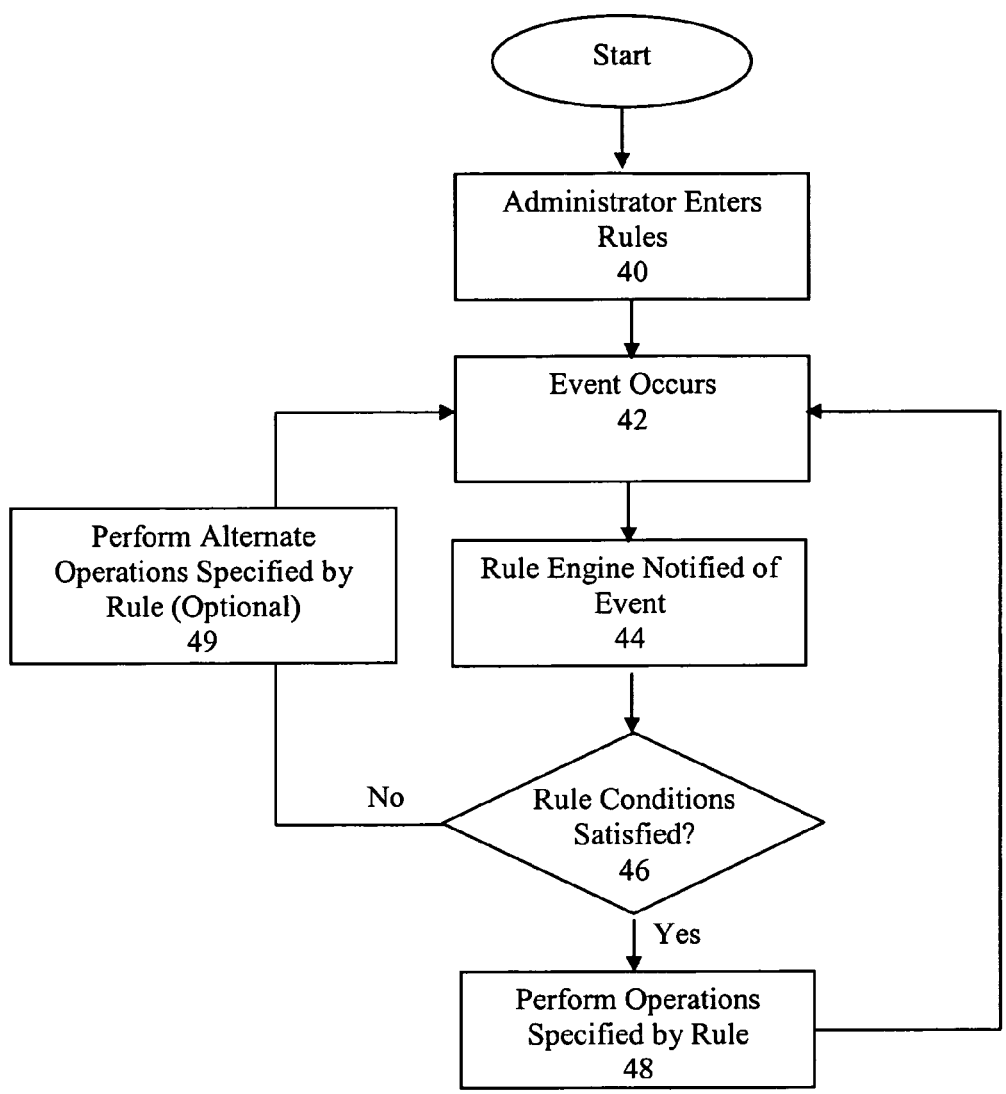
FIG. 3b illustrates a method for using a rule engine to control the provisioning of data center hardware, in accordance with an embodiment of the invention.

FIG. 3b illustrates a method for using a rule engine to control the provisioning of data center hardware for one or more VMs. As shown in FIG. 3b, the method may begin in step 40, wherein an administrator may enter one or more rules. The administrator may enter the rules, for example, using an administrative console. The rules may be based, for example, on an event-condition-action paradigm, wherein a particular event triggers one or more actions, possibly dependent on one or more conditions. The event may be a scheduled event or a system-driven event. In the case of a scheduled event, a particular time is input by an administrator, and at the scheduled time, the conditions are evaluated and an action may be performed. In the case of a system-driven event, an event occurring in the system triggers evaluation of the conditions and an action may be performed. As one particular example, a rule may specify that every night at 10 pm (scheduled event), if the number of active desktops in the Marketing group is zero (condition) and a new patch is available (condition), all the desktops in the Marketing group should be patched with the new software upgrade (action). In some implementations, the administrator may also modify existing rules to comply with the changing IT requirements of the company.

In step 42, an event may occur. The event may be a scheduled event or a system-based event. Examples of a system-based event include a user login, a user logout, a user requesting a desktop, a user requesting a renewal of desktop lease, an administrator login, an administrator logout, a time based scheduled event, or any other appropriate event. Other events will occur to those skilled in the art.

In step 44, the rule engine may be notified of the event. The rule engine may be notified, for example, by another software component in the system.

In the case of a scheduled event, a time based event generator may generate an event at a particular date and/or time. For example, a rule may specify a particular action be performed once a day at 9:00 pm. In this case, the time based event generator will generate an event and notify the rule engine at 9:00 pm every day. In the case of a system-driven event, the component of the system that is responsible for the occurrence of the system-driven event may notify the rule engine.

In step 46, it may be determined if the conditions specified by the rule are satisfied. If the conditions are satisfied, the action or actions specified by the rule may be performed. In some cases, conditions may be compounded using logical operators such as AND, OR, and NOT. Additional control flow statements such as WHILE, DO/WHILE, and the like could also be used in evaluating the conditions. Furthermore, in some cases, several conditions or sets of compounded conditions may be included, each with an associated action or actions. For example, one action may be performed if a condition evaluates to TRUE, and an alternate action may be performed if the condition evaluates to FALSE.

If a condition or set of compounded conditions is satisfied, the associated action or actions may be performed 48, for example, on a single virtual machine or on a logical group of virtual machines, such as, for example, a group of identical virtual machines that are designated as desktops for a particular set of employees. For example, if the conditions are satisfied, the action taken may be to power off all desktops for the marketing group.

In some implementations, one or more alternate operations may optionally be specified. The alternate operations may be operations to be performed if the conditions are not satisfied. If alternate operations are specified and the conditions are not satisfied in step 46, the alternate operations may be performed in step 49, and the method may return to step 42, wherein another event may occur.

The conditions are evaluated based on the current state of information in the system. In one implementation, software entities are maintained, and are used to evaluate the conditions. The software entities may represent the information in the system, and as changes are made to the information stored in the system, the software entities may be updated in real time. The software entities that are used to evaluate the conditions may include information specifying the load in the system, the parameters or state of one or more VMs in the system, or other information describing the virtualized system. Because the rule engine allows these conditions to be evaluated in real time based on the actual values in the system, the rule engine adds another level of flexibility in that it allows for alternative outcomes based on the current state of the software entities. In those cases where an administrator does not want to include a condition, but wishes the action to be performed regardless of the state of the information in the system, the condition field may be left blank. A blank or null condition field may always be considered to be satisfied, and the action will be performed regardless of the state of the information in the system. As an alternative to leaving the condition field blank, some other value may be placed in the condition field to indicate that the condition is always satisfied.

In some implementations, security features may be provided. For example, the event could include a virus detection or detection of unauthorized access. In this case, the virtual infrastructure operation could include taking appropriate measures to protect the security of the system. As one example, if a virus is detected in one VM (event), a scan could be performed for the virus (virtual infrastructure operation). The scan could be performed, for example, for all VMs system-wide that have the same configuration, same OS, or otherwise same software in which the virus was detected in the infected VM. This action could help prevent the spread of the virus.

As another example, if an unauthorized access attempt is detected (event), other VMs could then be alerted or otherwise protected against the attack (virtual infrastructure operation). As yet another example, if an unauthorized access attempt is detected on one VM, other VMs in the system could be "locked down," suspended, or powered off. Other security features that make use of the rule engine will occur to those skilled in the art.

The rule engine and time based event generator will be described further with reference to FIG. 4b.

Hardware Overview

Figure 3C:
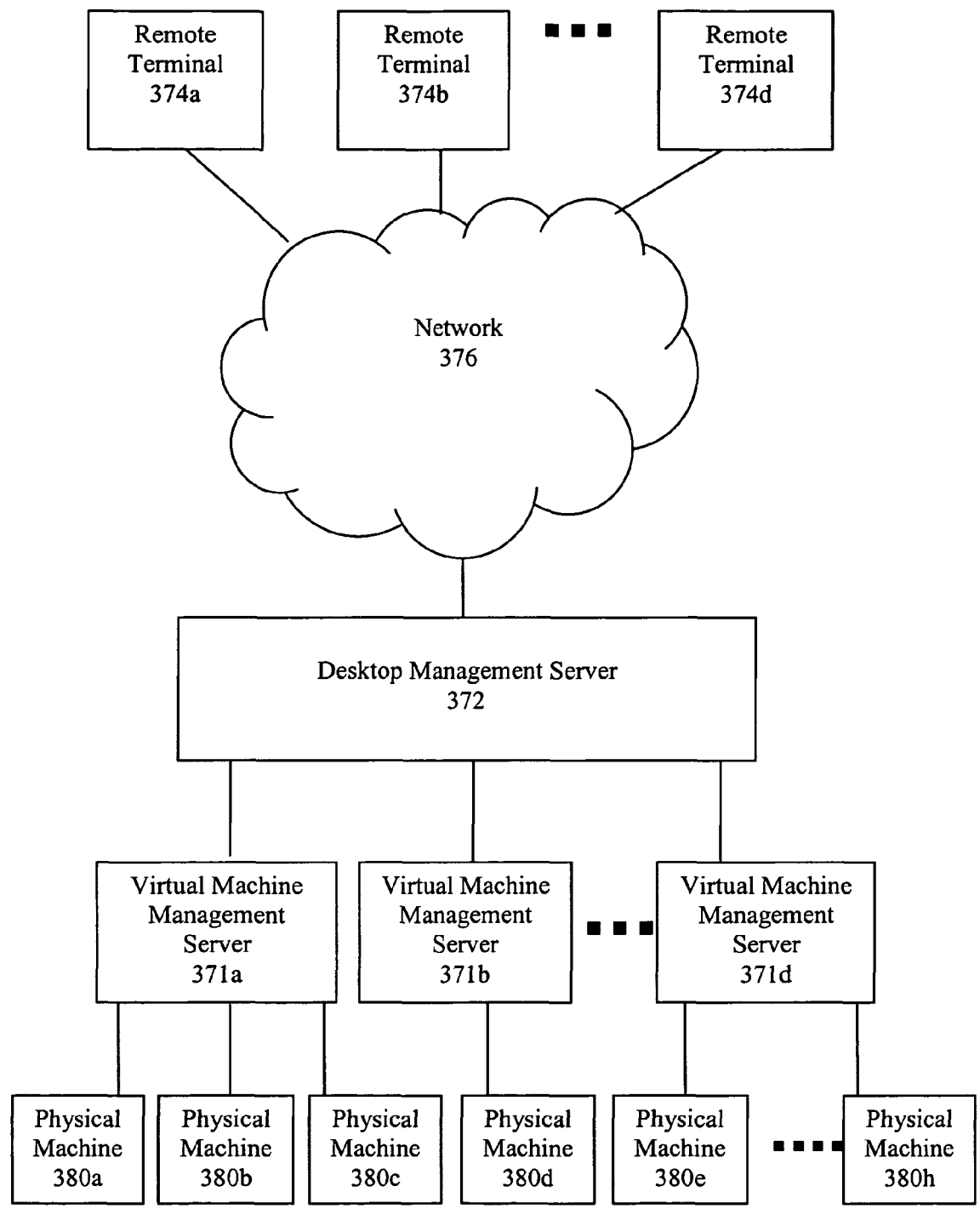
FIG. 3c illustrates a system of hardware components that may be used in embodiments of the present invention.

FIG. 3c illustrates hardware components that may be used in some implementations of the present invention. As shown in FIG. 3, a set of physical machines 380a, ... 380h (collectively "380") may be used to support remote desktop provision. The physical machines 380 may include servers, database systems or other storage systems, any other appropriate physical computers, or any combination thereof.

Each of the physical machines 380 may be in communication with a virtual machine management server 371a, ... 371d (collectively "371"), which provides a software interface to create, power on, and manage VMs residing on the physical machines 380. Each of the virtual machine management servers 371 may be in communication with a virtual desktop management server, which, for the sake of brevity, is referred to below simply as the "desktop management server" 372, which may be used to provide users with remote desktops using the VMs. In order to provide a user with a virtualized desktop, that is, access to a virtual machine that appears and functions essentially as a stand-alone desktop computer, the desktop server 372 may allocate a VM to the user. The virtualized desktop may be provided to the user on a physical computer terminal 374a, ... 374d (collectively "374") via a network 376, such as the Internet, an intranet, a local area network (LAN), a wide area network (WAN), a wireless network, and the like.

In order to provide a virtualized desktop to a user, the desktop management server 372 may provide various functionalities. For example, the desktop management server 372 may provide lease management services to ensure that a user's lease on a virtualized desktop has not expired. The desktop management server 372 may also provide inventory management services, used to manage resources, such as creating additional VMs or adding additional servers. Lease management and inventory management are discussed further with reference to FIGS. 4-5.

The desktop management server may also provide an administrative console (not shown in FIG. 3) that may be used by an administrator. The administrator may access the administrative console via a remote physical terminal 374, or via a physical terminal in direct communication with the desktop management server. The administrative console may be used, for example, to set QoS parameters for various VMs or for the system as a whole. The administrative console may also be used to create groups of VMs, such as, for example, groups of VMs that include similar or cloned VMs, or groups of VMs that are available to specific types of users. The administrative console may also be used to set user permissions, such as, for example, specifying a "lease" (the amount of time that a user has access to VMs), and to set other user parameters and QoS parameters, such as the number of virtualized desktops that may be allocated to a given user, the resources that are available to the user, or the types of VMs that a user may access. The administrative console is described further with reference to FIGS. 4-5.

The desktop management server 372 also provides a connection broker (not shown in FIG. 3) that allows users to access remote virtualized desktops. The connection broker located on the desktop management server 372 may work in conjunction with software located on the remote terminals 374 to provide users a connection to the remote desktop. In some implementations, the connection broker may be a web portal that allows users access to virtualized desktops via a web browser located on the remote terminal 374. In other implementations, specialized software may be provided on the remote terminal 374, that communicates with the connection broker to provide access to the virtualized desktop. The specialized software may be, for example, so-called "thin-client" software that uses minimal resources on the remote computers 374. In yet other embodiments, the connection broker communicates directly with the operating system software located on the remote computers 374, and the operating system is used to provide access to the virtualized desktop. Software that allows a user at a remote terminal to connect to a server to request and enable access to server-provided resources is well understood in the art.

As mentioned above, the invention makes it possible to provide either a primary remote virtualized desktop to a user, or a secondary virtualized desktop. Provision of a primary desktop may be used where a user's remote terminal does not have the full functionality of a normal desktop computer; in other words, the remote terminal is essentially "dumb," with minimal hardware support necessary, but is provided with a thin layer of software that enables it to connect through the network 376 to the desktop management server 372, to present the appropriate interface to the user, and to communicate user input back to the desktop management server so that the VM assigned to the user as a virtualized remote desktop can operate according to the user's input. In short, the primary "computer" the user will do his work on will in fact be a virtual machine running on a different computer, which he accesses via the network. For example, the remote terminal may be implemented as a Linux box that does not include a web browser. In this case, the operating system on the remote terminal, or a specialized thin-client software application on the remote terminal, may be used to connect to the remote desktop.

In the case of a secondary desktop, the user will already have the services of a computer locally, but wants to be able to access the services of yet another computer. In essence, the user wants to have at least one fully functional computer in addition to the one she already is sitting at, but without needing more than one "box." If a secondary desktop is to be provided, the remote terminal may include additional hardware and software, up to and including being a "complete" computer, with an operating system, various applications, the full range of hardware, etc. In this case, a web browser or a more robust specialized software application may be used to connect to the remote desktop.

As discussed above, some implementations of the invention use resource pool parameters and QoS parameters to provide load balancing and other features to maximize resource allocation. Lower level software running, for example, on the Virtual Machine Management servers 371, provides load balancing capabilities based on the resource pool parameters, as well as guaranteeing that the resource pool parameters and QoS parameters will not be exceeded. Load balancing, resource pool parameters, and QoS parameters will be discussed further with reference to FIG. 5.

Software Overview

Figure 4A:
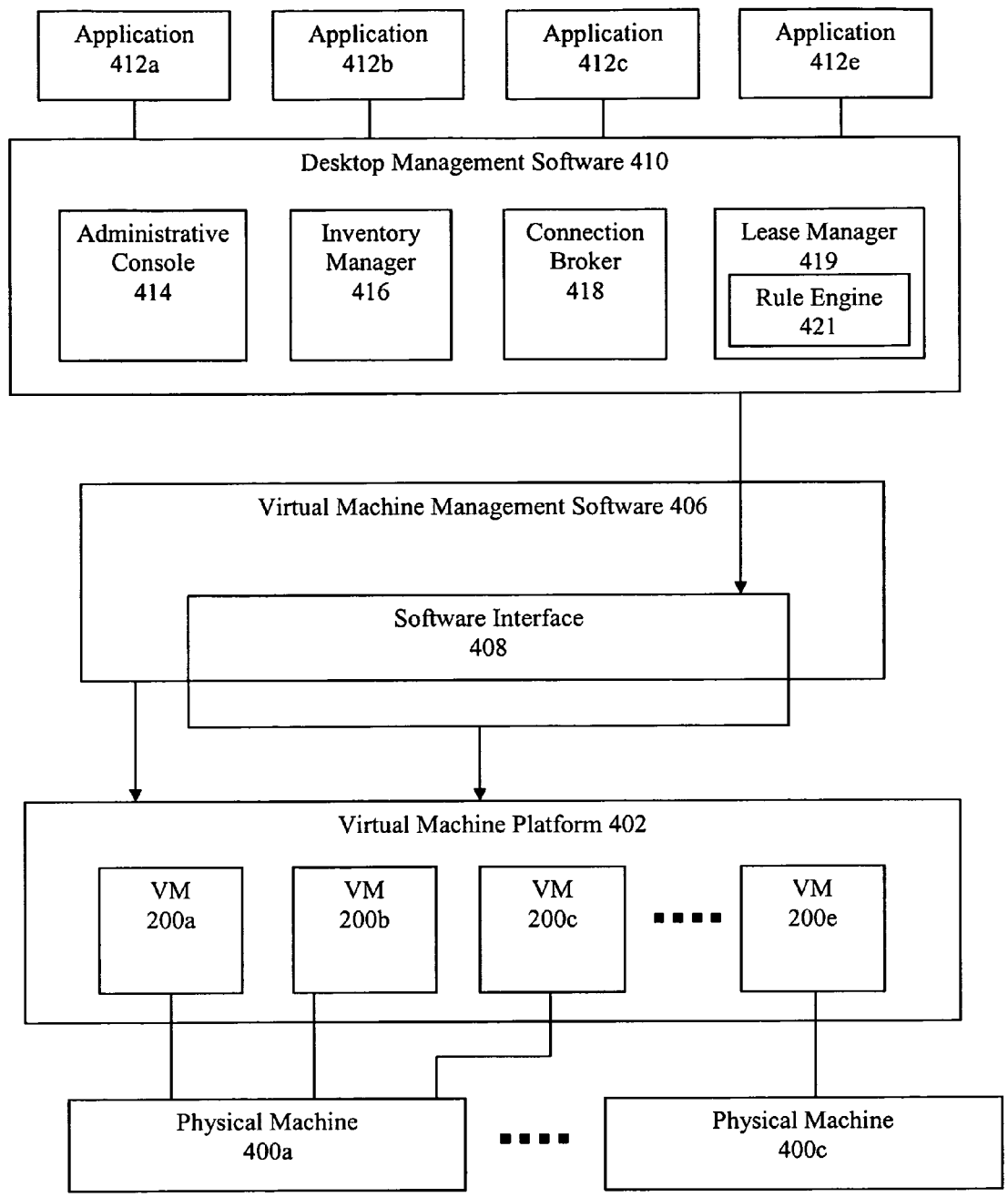
FIG. 4a illustrates a logical view of software components that may be used in embodiments of the present invention.

FIG. 4a is a logical view of software modules that are used in conjunction with some embodiments of the present invention. As shown in FIG. 4a, a plurality of physical machines 400a, . . . 400c (collectively "400") may be provided. The physical machines 400 may include servers, such as desktop management servers, database servers, and the like, and may also include other physical machines. A virtual machine platform 402 includes a plurality of VMs 200a, . . . 200e (collectively "200"), which use the resources provided by the physical machines 400 (which, although not software, are shown to further understanding of the preferred software hierarchy). Virtual machine management server 406 provides any known mechanism to create and/or manage the VMs 200. The virtual machine management server software 406 preferably includes a software interface 408 that provides functionality to create, monitor, and manage the VMs 200. For example, the software interface 408 may be used to monitor the CPU usage and memory usage of each VM 200, as well as to determine whether each VM 200 is active or powered off; such software is commercially available from VMware, Inc.

Desktop management software 410 may be used to provide remote desktop access using the VMs 200. The desktop management software 410 may reside, for example, on the desktop management server 372. The desktop management software may access and modify the VMs 200 via the software interface 408 and the virtual machine management software 406, in order to provision the VMs for remote desktop access. Once the VMs have been provisioned for remote desktop access by the desktop management software 410, applications 412a, . . . 412e (collectively "412") may execute on the VMs 200.

The virtual machine management software 406 may comprise management software that provides access to the VMs 200. The virtual machine management software 406 may include a GUI that allows administrators or other users to manage the VMs 200. For example, the GUI may be used to create, power on, power off, and monitor the VMs 200.

The virtual machine management software 406 may provide for the provisioning of new VMs. The virtual machine management software 406 may also be used in conjunction with the desktop management software 410 to allocate computing resources. For example, the desktop management software 410 may be used to set resource pool parameters such as user private pool parameters. The virtual machine management software 406 may ensure that resource pool parameters and/or QoS parameters are met, by denying a connection to a virtualized desktop if such a connection would cause parameters to be exceeded. The virtual machine management software may also allocate computing resources based on the resource pool parameters and/or QoS parameters. Allocation of resources will be discussed further with reference to FIG. 5.

Virtualized Desktop Management

The desktop management software 410 provides remote access to virtualized desktops implemented by the virtual machines 200. In order to obtain a virtualized desktop, a user provides authentication information and is presented with a list of virtualized desktops that are available, or a list of types of virtualized desktops that are available, based on the user's permissions. The user may select a virtualized desktop or type of virtualized desktop from the list to initiate a connection to a VM 200. The session may have a fixed lease indicating the amount of time for which the user may access the VM 200. In order to provide remote virtualized desktops, the desktop management software 410 may include an administrative console 414, an inventory manager 416, a connection broker 418, and a lease manager 419, which may be used in managing the virtual machines 200 to provide virtualized desktops.

Figure 4B:
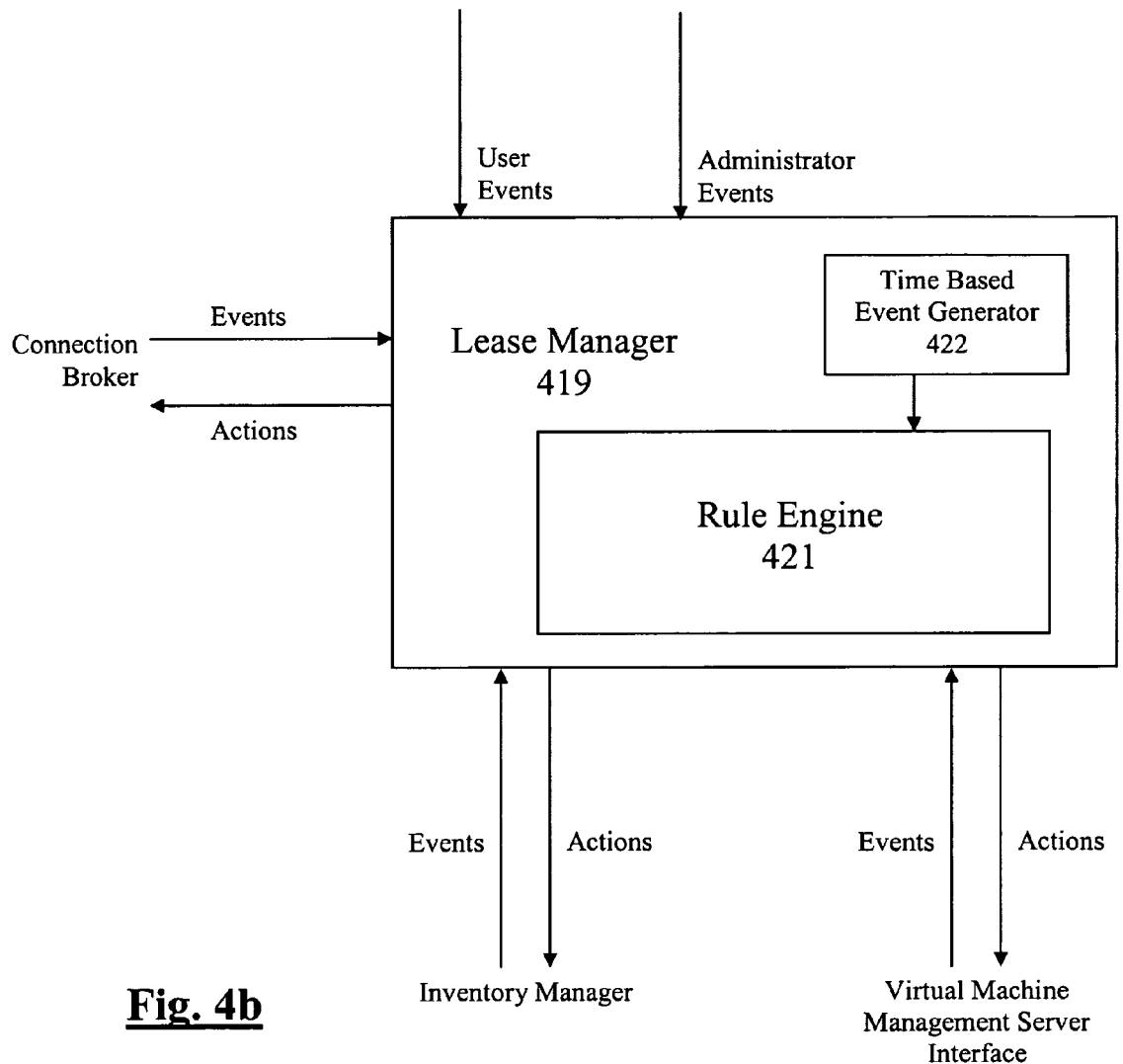
FIG. 4b illustrates a logical view of a rule engine, in accordance with embodiments of the present invention.
Figure 5:
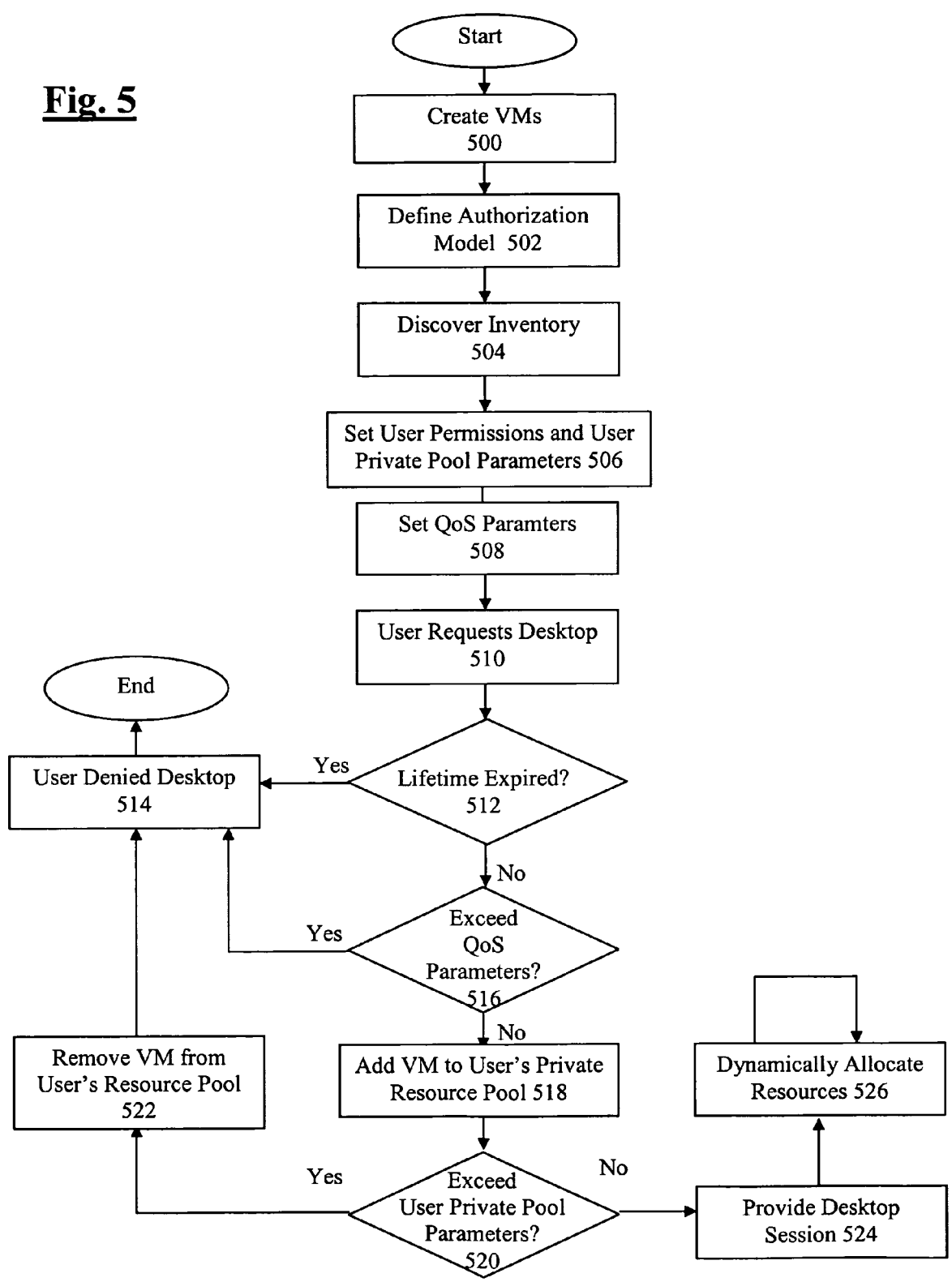
FIG. 5 is a flow chart illustrating a method for providing a remote user with a virtualized desktop, in accordance with some embodiments of the present invention.

Referring to FIGS. 4a, 4b, and 5, in order to provide one or more virtual machines to act as remote desktops, an administrator may first create the VMs 200 in step 500. The administrator may create the VMs, for example, using the virtual machine management software 406, or using the administrative console 414, which interfaces with the software interface 408. The administrator may also configure the VMs 200 for remote access using procedures that are defined by the virtualization interface for each virtualizable architecture.

In step 502, an authorization model may be designated for each VM. The authorization model may be defined, for example, by an administrator using the administrative console. Alternatively, definition of the authorization model may be partially or wholly automated. Defining an authorization model may include, for example, designating each VM 200 as either private (available only to a single user), or public (available to any user with the appropriate permissions). If a VM 200 is private, the administrator may designate users who are permitted to use the VM 200.

Defining an authorization model may also include creating one or more logical groups of VMs 200. Each logical group may contain similar VMs 200. For example, a logical group may include VMs that have the same virtualized hardware platform. As another example, a logical group may contain VMs that run the same set of software applications. As yet another example, a logical group may contain a set of cloned VMs that are identical in every aspect. Other logical groupings may be used as circumstances dictate.

In some implementations, private VMs are not included in any logical groupings of VMs 200. In these implementations, only public VMs are placed into logical groupings. A user may then have permission to access any public VM in a particular logical grouping.

Furthermore, in some implementations, each VM 200 may be designated as either persistent or non-persistent. This designation may be made by an administrator using the administrative console, or may be set automatically. The state of the persistent VMs may be stored, for example, in the physical machine 380, in an external file system, in shared storage or in another storage medium, while the state of the non-persistent VMs may not be stored. In some implementations, private databases may be set to be persistent, allowing the user of a private machine to alter the virtualized desktop, while public databases may be set to be non-persistent.

For example, a department of an organization may include a plurality of data-entry clerks and a manager. The manager may be provided access to a private persistent VM, and the data-entry clerks may be provided access to a logical grouping of public non-persistent VMs. The data-entry clerks may use any VM in the logical grouping to perform data entry, for example, in a database. However, because the VMs in the logical grouping are non-persistent, no changes may be made to the public VMs. This may ensure that the data-entry clerks obtain consistent desktops regardless of which VM in the logical grouping is being used, and provide an additional layer of security. However, because the manager has access to a persistent VM, changes to the desktop may be made by the manager. For example, the manager may create files using an application 412, and store those files on the desktop executing in the persistent VM.

Furthermore, because the VMs in the logical grouping are public, the system may be used to support more users than VMs. For example, when a data-entry clerk working a day shift logs off from a particular VM, the VM may be made available for a member of a night shift. In contrast, because the manager's VM is private, the manager need not worry that other users may have accessed the VM and altered or viewed the files or other information stored thereon.

The inventory manager 416 may be used to create and maintain an inventory of VMs 200 in the system. The inventory manager 416 may create a logical view of the inventory, for example, by using the software interface 408 to perform inventory discovery. The logical view of the inventory may include details for each VM in the system, such as, for example, the name of the VM, the name of the server hosting the VM, the operating system used by the VM, and the username(s) of the user(s) with access to the machine. The inventory manager 416 may store the logical view of the inventory in a database, such as a relational database. The inventory manager may also routinely poll for changes in the VMs, and may write any changes to the database. Furthermore, other software modules may query the inventory manager to obtain information regarding the VMs. The inventory manager may then access the information stored in the database and provide the appropriate information to the other software modules.

The administrative console 414 may query the inventory manager in order to retrieve information regarding the VMs. The information may be provided to an administrator, for example, using a GUI. The administrator may also make changes to the parameters and settings of the system or of the individual VMs using the GUI provided by the administrative console. Changes may be implemented via the software interface 408. If any changes are made to the parameters or configuration of a VM, the administrative console may transmit these changes to the inventory manager 416, so that the changes may be reflected in the logical view of the inventory stored in the database. Alternatively, the inventory manager 416 may poll or register callback events for changes from the virtual machine management software and write the changes to the database when they are discovered.

The connection broker 418 may be used to provide users with access to the VMs 200. The connection broker 418 may present a user with a login screen and perform authentication, possibly in conjunction with other software modules. The connection broker 418 may then obtain a list of VMs or logical groups of VMs available to the user via the inventory manager 416, and allow the user to select a VM or type of VM from the list. In some implementations, the user may be given the option to reconnect to an active session (such as a private VM allocated to the user), or to begin a new session. In some alternate implementations, a VM may be assigned to a user without receiving a user selection. The inventory manager 416 may then use the software interface 408 to obtain the endpoint details of the VM. The endpoint details of the VM may include, for example, the Internet Protocol (IP) address of the appropriate VM, gateway information, or any other information used to create a connection between the user and the VM. The user is then permitted to access the VM, for example, using Remote Desktop Protocol (RDP), Virtual Networking Computing (VNC), or some other appropriate protocol. In some implementations, the connection broker 418 may transmit a descriptor file to the user's terminal, and the user may open the file to obtain access to the VM via a full-screen RDP session, an Active-X session viewed via a web browser, a java applet embedded in a web browser or the like. Other implementations will occur to those skilled in the art.

The lease manager 419 may be used to ensure that a VM 200 is only allocated to a user for an appropriate time period. Using the administrative console, an administrator may specify a "lease" for one or more VMs 200. The lease may specify the period of time for which a user has access to a virtualized desktop. For example, a user may be provided with a lease of 8 hours. The lease for each VM 200 may be stored in the logical view by the inventory manager 416.

The lease manager 419 may periodically check for virtualized desktops with an expired lease. Any sessions with an expired lease may be disconnected, for example, by suspending the session or by powering off the VM. The VM may then be available for another user. The lease management functionality may thus provide additional flexibility to repurpose the resources used by the VM, for example, for use by workers in a different time zone, or for batch processing applications during off hours.

In some implementations, users may request a lease extension if they intend to use the VM for a longer duration. For example, a user who plans to work late may request a lease extension to ensure that the VM is not disconnected. In some implementations, the user may be notified about the end of the session through a pop-up browser window or an email notification.

In some implementations, lifetime management functionality may also be provided. Using the administrative console, an administrator may specify a "lifetime" for one or more users. The lifetime may specify the period of time for which a user has access to VMs. For example, a contract worker may be provided with a lifetime of 3 months. A lifetime manager may operate in a similar manner to the lease manager, and in some cases, may be integrated with the lease manager.

Rule Engine

The lease manager 418 may also contain a rule engine 421 that can be used to automate the policies of the organization. The rule engine 421 allows the administrator to dynamically manage the resources in the data center. It provides the flexibility to repurpose the same hardware for different purposes based on the needs of the organization. The rule engine is based on an event-condition-action paradigm. As shown in FIGS. 4a and 4b, the lease manager 418 is notified by other components in the system when specified events occur. These events may result in one or more actions depending upon the conditions defined in the rule by the administrator.

Events that may trigger an action may include a scheduled event or a system-driven event. System-driven events may include, for example, a user login, a user logout, a user requesting a desktop, a user requesting a renewal of desktop lease, an administrator login, an administrator logout, a time based scheduled event, or any other appropriate event. Other events will occur to those skilled in the art.

In the case of a time based scheduled event, a time-based event generator 422 may generate an event at a particular date and/or time. When a rule is created, the lease manager initiates the event with the time based event generator. Initiating an event includes transmitting information to the time based event generator, which causes the time based event generator to generate the event on either a one-time basis or on a recurring basis. After the lease manager initiates the event with the time based event generator, the time based event generator generates the events in a recurring way or generates a single specified event, as described by the rule.

In the case of a system-based event, no initiation may be required. The system may be configured such that each responsible software module will generate the appropriate system-based events without requiring explicit initiation.

As shown in FIG. 4b, events may be received from software modules in the system, such as from the time based event generator in the case of a time base event; or from another module, such as the administrative console, connection broker, inventory manager, or virtual machine management server interface, in the case of a system-based event. When the event is received, one or more rules may be triggered, and dependent on conditions specified by the rule, one or more actions may be triggered. The actions triggered are virtual infrastructure operations, and notification of the actions may be transmitted to a software module such as the connection broker, inventory manager, or virtual machine management server interface, so that the software module can perform the virtual infrastructure operation as specified by the rule.

For example, an administrator may define a rule specifying that a particular action be performed once a day at 9:00 pm. In this case, the lease manager will activate the event with the time base event generator, and the time based event generator will generate an event and notify the rule engine at 9:00 pm every day.

Rules may have some conditions associated with them. The conditions are evaluated based on the real-time values of the software entities stored in the system. Conditions may be established by using predicates.

Each of the conditions specified in the rules may be a single condition, or may be a combination of conditions separated by logical operators like OR, AND, NOT and the like. Additional control flow statements such as WHILE, DO/WHILE, and the like could also be used in evaluating the conditions. As one example, a combination of conditions may specify that the number active desktop sessions in group marketing is equal to 0, and the time is between 9:00 pm and midnight.

Furthermore, one event could be associated with a plurality of conditions or combinations of conditions, and a plurality of actions. For example, a rule may specify that when a user logs off a desktop (event), if the user is in the marketing group and the time is after 8:00 pm (first combination of conditions), a server should be powered off (first action); if the user is not in the Marketing group (second condition), the desktop should be powered off (second action); and if the time is before 3:00 pm (third condition), the desktop should be migrated to a different server.

As discussed above, the conditions are evaluated based on the current state of software entities in the system. Because the rule engine allows these conditions to be evaluated in real-time based on the actual values in the system, the rule engine adds another level of flexibility in that it allows for alternative outcomes based on the state of the system. In those cases where an administrator does not want to include a condition, but wishes the action to be performed regardless of the state of the information in the system, the condition field may be left blank. A blank or null condition field may always be considered to be satisfied, and the action will be performed regardless of the state of the information in the system. As an alternative to leaving the condition field blank, some other value may be placed in the condition field to indicate that the condition is always satisfied.

The actions are applied based on the outcome of the conditions of the rule. The actions could be applied to one or more desktops. In one implementation, a rule may be applied to a logical group of desktops, for example, the desktops assigned to marketing employees.

The actions that are performed are virtual infrastructure operations. A virtual infrastructure operation is any operation that affects the properties of one or more VMs, such as operations that allocate resources to VMs, change the state of VMs, change the other properties of VMs, or change the properties of the hosts running the VMs.

Examples of virtual infrastructure operations include: powering on a VM, powering off a VM, suspending VM, resuming a VM, cold migration a VM (a migration that is performed while the VM is off-line), hot migration of a VM (a migration that is performed while the VM s on-line), creation of a VM, deletion of a VM, cloning a VM, taking a snapshot of a VM, adding a host to the cluster of physical hosts used for hosting desktops, removing a host from the cluster of physical hosts used for hosting desktops, and the like. Additional virtual infrastructure operations will occur to those skilled in the art.

The actions are applied on virtualized desktops using the software interface 408. The actions maybe applied to objects*** maintained by the Inventory Manager. Some actions maybe used to send notifications to the Connection Broker. The actions may be applied to a single desktop, or to a plurality of desktops in a logical group, as defined by the administrator.

Continuing the earlier examples, a rule may state that, if a condition is satisfied, the action is to suspend all the VMs in the marketing group. An administrator may also specify an alternate action to be performed if the condition is not satisfied.

Furthermore, in some cases, an action that occurs as a result of a rule may constitute another event. For example, if a rule specifies that a desktop be powered off based on an event and the evaluation of a condition, the action of powering off the desktop could act as another event to trigger another rule. Thus, based on one initial event, a chain of actions could occur, dependent on the conditions specified in the rules.

The rule engine has a repository of rules that are triggered on specific events. The events may be system-based events or may be scheduled events that are generated by the time based event generator.

The rules can be defined using the administrative console 418 and stored using a declarative language such as XML. The rules may be stored, for example, in flat files on a file system, or in a relational database. In some implementations, the administrator can load and modify an existing rule. When a new rule is defined or an existing rule is modified, a registration operation may be used to check that the rule is valid.

The registration process checks if the rule is valid, and the rule engine 421 checks if the rule is well-formed and valid, i.e., if it conforms to a specified document model. The rule engine 421 may implement a parser to interpret the rule definitions to check for validity. It also implements a filtering mechanism to efficiently find the rules which that are triggered by specific events. The administrator may "unregister" a rule from the desktop management software, which will delete the rule from the file system or the database.

In some implementations, rules may be designated as active or inactive. In this case, a rule must be active for it to run on the rule engine. An active rule is executed whenever there is an event that satisfies the rule. An administrator may set rules to be active or inactive, depending on changing needs. Inactive rules are not executed on any event. Inactive rules are not deleted from the system and can therefore be re-activated in future.

Existing rules can also be modified. To modify a rule, an administrator must change the rule state from active to inactive. Since the rule is defined in a declarative language and may be stored on a database or file system, it may be modified directly without using the administrative console 414. In some implementations, the administrative console 414 may be used, alternatively or in addition, to modify the rules.

When a new rule is created or an existing rule is modified, the rule engine 421 checks if the modified rule conflicts with other active rules in the system. In the case of a conflicting rule, actions may be taken to resolve the conflict. Depending on the types of conflicting rules and the user preferences, the conflict may be resolved by discarding the older rule, discarding the newer rule, or by notifying an administrator to solicit input that may be used to resolve the conflict.

In one implementation, if a newly modified rule conflicts with an older rule, an administrator may be notified and the rule modifications may be discarded. For example, an active rule may specify that all desktops in marketing must be suspended after 9:00 pm. If an administrator defines a new rule that all desktops in marketing should be powered off after 9:00 pm, it conflicts with the first rule. In such case the rule is discarded and the administrator is notified that the rule conflicts with existing rule(s).

In another implementation, prioritization is used in the case of a conflict. For example, a user may ask for a desktop lease renewal, but the administrator has already defined a rule that all desktops should be powered off at a specific time. In such cases, the rule maybe defined as binding or non-binding. The binding rules are guaranteed to execute. Non-binding rules can be configured for offline contact. For example, in this case the administrator may configure the system to provide email notifications if the rules are conflicting. The administrator can then manually de-active the rule and allow the desktop renewal for the user. Prioritization of rules may also be used in such cases. An administrator may prioritize rules, for example, using the administrative console 418. In the case of a conflict, the rule with the higher priority may execute.

Rules may be created to provide lifetime management functionality. Using the administrative console 418, an administrator may specify a "lifetime" for one or more users or virtual machines. The lifetime may specify the period of time for which a user has access to desktop. For example, a contract worker may be provided with a lifetime of 3 months. The lease manager 419 may register a rule that the user account should be deleted after 3 months. Similarly, the administrator may specify the period of time for which a virtual machine may be used by different users. Once the lifetime expires the virtual machine will be deleted.

The lease manager 419 can also define rules related to usage policies. For example, users in a data entry group may be allowed to access desktops only during the weekdays and not during the weekends. Guest accounts may be valid only during office hours. Similar rules can be created for different groups based on the requirements of the company.

The rule engine 421 thus provides time-based scheduling and event-driven operations for managing hardware by controlling the virtual machine infrastructure operations. The rule engine 421 may also control the migration of virtualized desktops from one physical server to another. The rule engine 421 may also include the ability to automate the process of changing the resources allocated to the virtual machines in a timely fashion.

For example, an offshore team may include three different shifts in a day, the shifts sharing the same resources. Due to security considerations, all the employees in the three shifts should have access to different virtualized desktops. In this case, an administrator may define a plurality of rules. For example, if a first shift works from 9:00 am to 5:00 pm, and a second shift begins at 6:00 pm, the administrator may define a first rule specifying that virtualized desktops numbered 101-200 should be powered on at 8:00 am, and a second rule specifying that virtualized desktops 101-200 should be powered off at 5:00 pm. This will ensure that these 100 virtualized desktops are available for the first shift. The administrator may also define a third rule specifying that virtualized desktops numbered 201-250 should be powered on at 5:30 pm. This will ensure that these 50 virtualized desktops are available for the second shift. Since the total physical resources are same in each shift, the resources available to each virtualized desktop in the second shift exceed the resources available to the each virtualized desktop in the first shift. The rule engine thus, can be used to create rules that may perform the resource allocation automatically.

As another example, virtualized desktops may be provided to employees in the financial market. The financial market requires hardware for desktops as well as for servers running simulations, prediction programs, and the like. In this case, the rule engine may be used to allocate hardware to virtualized desktops during the day and to the servers at night. An administrator could define a first rule specifying that virtualized desktops numbered 301-400 should be powered on at 9:00 am, and define a second rule specifying that those virtualized desktops are to be suspended at 5:00 pm, when the market closes. The administrator could define a third rule specifying that a server numbered 501 should be powered on at 5:30 pm, in order to run simulations for next-day predictions. Thus, the server may use the same resources as the virtualized desktops, simplifying the cost and complexity of the hardware. The administrator could further define a fourth rule specifying that all the hardware should be powered off at 11:00 pm every night to save power.

The rule engine 421 may also be used to migrate virtualized desktops from one physical server to another. For example, during a daytime shift, 100 virtualized desktops may be provided on 10 physical servers. During the nighttime shift, it is anticipated that few workers will be using the virtualized desktops, and thus it is anticipated that fewer resources will be needed for the desktops. In this case, the 100 virtualized desktops may be consolidated onto 5 of the 10 physical servers, allowing the remaining physical servers to be powered down or used for other purposes. In some implementations, rules-based operations such as migration of virtualized machines may be performed only if resource pool parameters and QoS parameters are not exceeded by the migration. In other implementations, the rule engine may operate independently of the resource pool parameters and QoS parameters, and rules-based operations such as migration of virtualized machines may be performed regardless of resource pool parameters and QoS parameters.

The rule engine may thus provide the automation required to control the data center hardware. This allows multiple servers and/or virtualized desktops to share the same hardware on a time-managed basis.

Resource Pools and QoS Parameters

Some implementations of the invention allow various QoS parameters to be specified, and guarantee that the QoS parameters will be met. Furthermore, implementations of the invention provide load balancing and other features to maximize resource allocation.

In order to perform resource allocation, one or more "resource pool" parameters may be specified for each user. Resource pool parameters are parameters that guarantee certain resources to certain VMs or groups of VMs. Resource pool parameters that are specified for a particular user may be referred to as "user private pool parameters," and the resources guaranteed to the user may be referred to as a "user private pool."

In implementations of the invention, users may open a plurality of virtualized desktops, each virtualized desktop running on a VM 200. Regardless of the number of sessions open, the user private pool parameters guarantee resources to the user across a cluster of physical machines. Other resource pool parameters guarantee resources to each VM.

The user pool parameters specify a range of guaranteed resources to a user, and the other resource pool parameters specify a range of guaranteed resources to a VM or group of VMs. The actual resources provided to a user or VM will vary based on the needs to the user or VM. If additional resources are available, the resources provided to a VM may exceed the resource pool parameters; however, it is not guaranteed that resources in excess of the resource pool parameters can be provided.

The user pool parameters can be described by absolute compute resource metrics like GHz for CPU and MBytes for memory. The parameters can also be described in relative shares format. For example in a compute cluster of 10 hosts user A can be provided with 1000 shares out of the total 10000 shares and user B can be provided with 2000 shares. User B is automatically entitled to double resources compared to user A.

The resource pool parameters may be specified by an administrator using the administrative console, or may be specified by the administrative console based on the privileges of the user. Each resource pool parameter may specify a range of possible resources. For example, an administrator may specify using the administrative console 414 that a particular user, or a particular type of user, has a memory allocation between 128 MB and 2 GB, and a CPU usage between 300 MHz and 2.0 GHz. The user is thus guaranteed to have at least the minimum resources specified at all times, and the user is guaranteed to have up to the maximum resources specified, based on the user's needs. In some cases, where the entitlements are in relative shares format, if extra resources are available, the user may be provided with unused resources.

When the user wishes to open a new desktop session or perform an action using an existing desktop session, it is first determined whether any of the resource pool parameters would be exceeded. If so, the user may be unable to open the new desktop session or perform the action. In addition to the resource pool parameters, one or more QoS parameters may be specified. The QoS parameters may describe, for example, the maximum number of VMs that may be allocated to any one user, the maximum number of VMs that may run on each physical machine, and the maximum number of VMs that may be managed by each virtual machine management server. If opening a new desktop session or performing some other action would cause one of the QoS parameters to be exceeded, the action will not be allowed. For example, QoS parameters may specify that each user may connect to no more than 5 VMs, that each physical machine may run no more than 500 VMs, and that each virtual machine management server may manage no more than 1000 VMs. When a user wishes to open a new desktop session, it is first determined whether all of the QoS parameters would be met. If the QoS parameters would not be met, the user may be unable to open the new desktop session or perform the action.

The QoS parameters thus specify the maximum load of the system, and the resource pool parameters specify the resources that are guaranteed to a user or VM. Requiring that the QoS parameters and the resource pool parameters are met may ensure acceptable performance of the system.

Lower level software may use resource pool parameters, for example, to specify the resources that are available on a particular physical machine and to ensure that the VMs running on the physical machine do not exceed the available resources. The lower level software thus provides load balancing capabilities based on the resource pool parameters. However, by assigning resource pool parameters to a particular user, the desktop management software creates a private resource pool for each user, thus allowing the lower level software to perform load balancing and other functionality for each user as well as for each physical machine.

Dynamic load balancing may thus be used to allocate resources such as processor time, memory and secondary storage, among other possible resources, between the multiple VMs supported by the virtualized computer platform, between the users of the system, and between the physical machines 400. Dynamic load balancing may also be used to distribute the VMs supported by the virtualized computer platform among the physical machines 400. Details of how the hierarchy of resource pools in a computer cluster are maintained, the admission control policy and the monitoring of physical hosts for distributed resource scheduling may be determined according to the needs of each situation and be implemented using other known routines.

Process Execution

FIG. 5 is a flow chart depicting a method for providing a remote desktop session to a user. As shown in FIG. 5, the method may begin in step 500, wherein one or more VMs 200 may be created.

The method may continue in step 502, wherein an authorization model may be defined for each VM. The authorization model may be defined, for example, by an administrator. Defining an authorization model 502 may include, for example, designating each VM 200 as public or private, and/or designating the user(s) permitted to use each VM. Defining an authorization model 502 may further include placing VMs into one or more logical groups of VMs. For example, a logical group of VMs could include a plurality of VMs with the same virtual architecture, a plurality of VMs running the same operating system, a plurality of VMs running the same applications, and the like.

The method may continue in step 504, wherein inventory discovery may be performed, for example, via an inventory manager. The inventory discovery may discover all VMs configured to provide remote desktop sessions. Information describing the discovered VMs may be stored in an external database like a relational database, object-oriented database, or the like, and a logical view of the discovered VMs may be presented to the administrator, for example, via an administrative console. The information stored in the relational database and the information presented to the administrator may include relevant data for each VM, such as the VM name, the resources available on the VM, the name of the physical machine hosting the VM, and the like. Inventory discovery may be performed 504 at any time during the method of FIG. 5. In particular, it is contemplated that inventory discovery may be performed routinely to ensure that the discovered inventory accurately reflects the state of the system. In one implementation, inventory discovery 502 may be performed any time a VM is added to the system, any time a server or other physical machine is added to the system, or any time a change is made to one of the VMs or physical machines in the system.

In step 506, user permissions and user private pool parameters may be set. The user permissions and user private pool parameters may be set, for example, by an administrator via an administrative console. The user permissions could include, for example, the duration of the lease for a user, the type(s) of VMs accessible to the user, and the like. The user private pool parameters could include, for example, resource pool parameters such as the range of CPU usage for the user, a range of memory usage for the user, and the like. The user private pool parameters are specified for a specific set of physical machines i.e. for a computer cluster.

In step 508, QoS parameters may be set. The QoS parameters may be set, for example, by an administrator via an administrative console. The QoS parameters could include, for example, the maximum number of VMs that may be allocated to any one user, the maximum number of VMs that may run on each physical machine, and the maximum number of VMs that may be managed by each virtual machine management r server.

While steps 500-508 have been illustrated as occurring first for the sake of clarity, steps 500, 502, 504, 506, and 508 could be executed at any time. For example, steps 502, 504, 506, and 508 could be executed for a newly created VM to allow the newly created VM to provide a remote desktop session. Steps 504, 506, and 508 could be executed at any time to adjust the parameters of the system or the VMs or to alter the logical groups of VMs. Some implementations of the system provide for real-time adjustments to these parameters, allowing changes to be made to the system without requiring system downtime.

In step 510, a user may request a virtualized desktop. For example, the user may present login credentials and be provided with a list of available virtualized desktops or types of virtualized desktops. In some implementations, the user is able to connect to an existing desktop session for that user, or to start a new session altogether. In this case, the list of available virtualized desktops may include all existing desktop sessions for the user, as well as all available virtualized desktops, or available types of virtualized desktops, which are accessible to the user. The user may then select a virtualized desktop from the list. Requesting a virtualized desktop 510 may be performed, for example, via a user console. For example, a user may have a private VM. This virtualized desktop is thus available only to that particular user, and the connection to that VM is thus considered an existing desktop session for that user. When the user logs into the system, the user may choose to reconnect to that existing desktop session, and/or to start a new desktop session.

In step 512, it may be determined whether the lifetime of the selected VM has expired. If the lifetime has expired, the user may be denied access to the selected virtualized desktop 514.

In step 516, it may be determined whether providing the VM to the user would cause the QoS parameters to be exceeded. If providing the VM would cause the QoS parameters to be exceeded, the user would be denied access to the selected virtualized desktop 514. In step 518, the requested VM may be added to the private resource pool for the user. In step 520, it may be determined whether the user private pool parameters can be met. Each user private resource pool specifies minimum and maximum resources that may be guaranteed to the user. In addition, each VM may specify the minimum and maximum resources that must be guaranteed for that VM. If the sum of the maximum resources for all the VMs assigned to a user exceeds the user private resource pool for that user, the maxima cannot be guaranteed for all the VMs simultaneously. In this case, the user will not be allowed to access the VM.

In one implementation, determining whether the user private pool parameters can be met includes attempting to power the VM on. If the user has elected to open a new desktop session, an available VM may be selected from the appropriate logical group of VMs, for example, using a round robin allocation policy, and based on parameters such as the maximum number of active sessions for each physical machine. The VM may be powered on, for example, using the software interface. The admission policy (i.e. the decision whether the power-on operation on the VM will not exceed the user resource pool parameters) is done by the lower layers. If the resource private pool parameters cannot be met, the VM will not be powered on, and the method will continue in step 522. If the user private pool parameters and all the other resource pool parameters can be met, the VM will be powered on, and the method will continue in step 524. If it is determined that the resource pool parameters are exceeded 520, the VM is removed from the user's private resource pool 522, and the user is denied access to the desktop 514.

In step 524, the desktop session may be made available to the user. If the user has elected to connect to an active desktop session, the endpoint details of the active desktop session may be retrieved via the inventory manager, and the desktop session may be initiated.

In the foregoing specification, the embodiments have been described with reference to specific elements thereof. It will, however, be evident to those of skill in the art that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

For example, the invention may be implemented as one or more computer programs or as one or more computer program modules embodied in one or more computer readable media, including any persistent or volatile storage or memory device. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

What is claimed is:

1. A computer-implemented method for automating provisioning policies for dynamically allocating resources to one or more virtual desktops, comprising:
    under control of desktop management software programmed to automatically control provisioning of virtual desktops to one or more users:
        determining an occurrence of an event related to at least one of: a user request of a virtual desktop; a user request of a renewal of a desktop lease; an administrator login; an administrator logout; and/or a policy, resource requirement, or time specification that affects provisioning of the one or more virtual desktops to the one or more users;
        from a stored plurality of rules, each of the stored plurality of rules having a rule definition comprising an indication of an event relating to provisioning and/or use of the one or more virtual desktops, an indication of a corresponding virtual infrastructure operation used to allocate resources to the one or more virtual desktops, and an indication of a condition to be satisfied in order to cause the corresponding virtual infrastructure operation to be performed, selecting a rule corresponding to the determined event based upon the rule definitions of one or more of the stored plurality of rules;
        evaluating the condition indicated in the rule definition of the selected rule based upon a current state of the virtual infrastructure; and
        when the evaluated condition is satisfied, causing the corresponding virtual infrastructure operation to be performed on one or more virtual machines, thereby affecting resources of the one or more virtual desktops.

2. The method of claim 1, wherein the determined event is a system-driven event.

3. The method of claim 1, wherein the determined event is a scheduled event.

4. The method of claim 3, wherein the scheduled event is generated by a time based event generator.

5. The method of claim 1, wherein the condition indicated in the rule definition of the selected rule is a compound condition.

6. The method of claim 1, wherein the evaluated condition is a plurality of conditions.

7. The method of claim 1, wherein the evaluating the indicated condition indicates that the condition is satisfied.

8. The method of claim 1, wherein the virtual infrastructure operation that is caused to be performed is one of a plurality of virtual infrastructure operations specified by the selected rule and is based on evaluating one or more corresponding conditions indicated by the rule definition of the selected rule.

9. The method of claim 1, wherein the indicated condition is evaluated based on the state of software entities in the system.

10. The method of claim 1, wherein the indicated condition is set to a default value, and the evaluating the indicated condition indicates that the condition is satisfied.

11. The method of claim 10, wherein the default value is null.

12. The method of claim 1, wherein the determined event comprises a user login and/or a user logout.

13. The method of claim 1, wherein the determined event comprises a user requesting a desktop.

14. The method of claim 1, wherein the determined event comprises a user requesting a renewal of desktop lease.

15. The method of claim 1, wherein the determined event comprises an administrator login and/or an administrator logout.

16. The method of claim 1, wherein the corresponding virtual infrastructure operation caused to be performed comprises allocating resources to one or more virtualized desktops.

17. The method of claim 1, wherein the corresponding virtual infrastructure operation caused to be performed comprises changing the state of one or more virtualized desktops.

18. The method of claim 1, wherein the corresponding virtual infrastructure operation caused to be performed comprises changing the properties of one or more host systems running the virtualized desktops.

19. The method of claim 1, wherein the corresponding virtual infrastructure operation caused to be performed comprises powering on, powering off, suspending, and/or resuming one or more virtualized desktops.

20. The method of claim 1, wherein the corresponding virtual infrastructure operation caused to be performed comprises migration of one or more virtual machines.

21. The method of claim 1, wherein the corresponding virtual infrastructure operation caused to be performed comprises creating and/or deleting one or more virtual machines.

22. The method of claim 1, wherein the corresponding virtual infrastructure operation caused to be performed comprises cloning one or more virtualized desktops.

23. The method of claim 1, wherein the corresponding virtual infrastructure operation caused to be performed comprises taking a snapshot of one or more virtualized desktops.

24. The method of claim 1, wherein the corresponding virtual infrastructure operation caused to be performed comprises adding to and/or removing a host from the cluster of physical hosts used for hosting one or more virtualized desktops.

25. The method of claim 1, wherein the corresponding virtual infrastructure operation is performed on one virtualized desktop.

26. The method of claim 1, wherein the corresponding virtual infrastructure operation is performed on a plurality of virtualized desktops.

27. The method of claim 26, wherein the plurality of virtualized desktops is a logical group of virtualized desktops.

28. The method of claim 27, wherein the logical group of virtualized desktops is defined by an administrator.

29. The method of claim 1, wherein one or more of the plurality of rules are specified as being either active or inactive, and the corresponding virtual infrastructure operation of the selected rule is caused to be performed only if the selected rule is active.

30. The method of claim 1, wherein one or more of the plurality of rules are specified as being either registered or unregistered, and the corresponding virtual infrastructure operation of the selected rule is caused to be performed only if the selected rule is registered.

31. The method of claim 1, wherein one or more of the plurality of rules are specified as being either binding or non-binding.

32. The method of claim 31, wherein, if the selected rule is binding and a conflicting rule exists, the corresponding virtual infrastructure operation of the selected rule is caused to be performed in accordance with the selected rule.

33. The method of claim 31, wherein, if the selected rule is non-binding and a conflicting rule exists, the corresponding virtual infrastructure operation of the selected rule is not caused to be performed.

34. The method of claim 1, wherein the selected rule has a specified priority level.

35. The method of claim 34, wherein, if a conflicting rule exists and the conflicting rule has a lower priority than the selected rule, the corresponding virtual infrastructure operation of the selected rule is caused to be performed in accordance with the selected rule.

36. The method of claim 34, wherein, if a conflicting rule exists and the conflicting rule has a higher priority than the selected rule, the corresponding virtual infrastructure operation of the selected rule is not caused to be performed.

37. A computer-readable medium containing content that controls a processor, when executed, to perform a method in desktop management software programmed to automatically control provisioning of virtual desktops to one or more users, comprising:
    under control of the desktop management software, determining an occurrence of an event related to at least one of: a user request of a virtual desktop; a user request of a renewal of a desktop lease; an administrator login; an administrator logout; and/or a policy, resource requirement, or time specification that affects provisioning of the one or more virtual desktops to the one or more users;
    from data storage comprising one or more stored rules, each stored rule comprising a rule definition having an indication of an event relating to provisioning and/or use of the one or more virtual desktops and one or more indications of virtual infrastructure operations used to allocate resources to the one or more virtual desktops, each indicated virtual infrastructure operation having one or more associated conditions to be satisfied to cause the associated virtual infrastructure operation to be performed, determining a rule that corresponds to the determined event based upon the rule definitions of one or more of the stored rules;
    evaluating the one or more conditions associated with the one or more indicated virtual infrastructure operations of the determined the rule based upon a current state of the virtual infrastructure; and
    based on the result of the evaluation of the one or more conditions, causing at least one of the one or more virtual infrastructure operations of the determined rule to be performed on one or more virtual machines, thereby affecting one or more virtual desktops.

38. The computer-readable tangible medium of claim 37 wherein the computer-readable tangible medium is a memory in a computer system and the contents are instructions stored in the memory.

39. The computer-readable tangible medium of claim 37 wherein the evaluated one or more conditions comprise at least one compound condition that incorporates logical operators and/or control flow statements.

40. The computer-readable tangible medium of claim 37 wherein the at least one of the one or more virtual infrastructure operations are caused to be performed when the result of the evaluation indicates that the one or more conditions are satisfied.

41. The computer-readable tangible medium of claim 37 wherein the evaluating the one or more conditions is based upon a current state of the virtualization infrastructure.

42. The computer-readable tangible medium of claim 37 wherein the determined event is a time-based event or a system-based event.

43. A computing system for automatically provisioning policies for a plurality of virtual desktops in a virtualization infrastructure, comprising:
    a memory;
    a computer processor;
    a desktop management software component, stored in the memory and configured, when executed on the computer processor, to automatically control provisioning of virtual desktops to one or more users; and
    a rule engine software component, accessed by the desktop management software component and configured to:
        store a plurality of rule definitions that each correspond to an event relating to provisioning and/or use of the one or more virtual desktops, each definition indicating a virtual infrastructure operation to be performed when an associated condition is satisfied;

detect an occurrence of a time-based or a system-based event related to at least one of: a user request of a virtual desktop; a user request of a desktop lease; an administrator login; an administrator logout; and/or a policy, resource requirement, or time specification that affects provisioning and/or use of the one or more virtual desktops;

determine a rule definition corresponding to the detected event occurrence;

evaluate the condition associated with the determined rule definition based upon a current state of the virtual infrastructure;

when the condition is satisfied, cause the virtual infrastructure operation indicated by the determined rule definition to be performed; and when the condition is not satisfied, not cause the virtual infrastructure operation indicated by the determined rule definition to be performed.

44. The system of claim 43 where the virtual infrastructure operation is an operation that causes one of more of: allocation of resources to one or more virtual machines, changes the state of one or more virtual machines, changes software running on one or more virtual machines, change properties of one or more virtual machines, and/or changes properties of one or more hosts running one or more virtual machines.

* * * * *